(12) United States Patent
Reinecke et al.

(10) Patent No.: US 10,310,877 B2
(45) Date of Patent: Jun. 4, 2019

(54) CATEGORY BASED EXECUTION SCHEDULING

(71) Applicant: Hewlett Packard Enterprise Development LP, Houston, TX (US)

(72) Inventors: Philipp Reinecke, Bristol (GB); Brian Quentin Monahan, Bristol (GB); Granville Barnett, Bristol (GB); Patrick Goldsack, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/573,112

(22) PCT Filed: Jul. 31, 2015

(86) PCT No.: PCT/EP2015/067732
§ 371 (c)(1),
(2) Date: Nov. 9, 2017

(87) PCT Pub. No.: WO2017/020941
PCT Pub. Date: Feb. 9, 2017

(65) Prior Publication Data
US 2018/0113729 A1    Apr. 26, 2018

(51) Int. Cl.
*G06F 8/41* (2018.01)
*G06F 8/70* (2018.01)
*G06F 9/455* (2018.01)
*G06F 9/48* (2006.01)
*G06F 11/30* (2006.01)
(Continued)

(52) U.S. Cl.
CPC ........ *G06F 9/45525* (2013.01); *G06F 8/4441* (2013.01); *G06F 8/70* (2013.01); *G06F 9/4552* (2013.01); *G06F 9/4881* (2013.01); *G06F 11/3024* (2013.01); *G06F 11/3495* (2013.01); *G06F 11/3604* (2013.01)

(58) Field of Classification Search
CPC ........ G06F 8/4441; G06F 8/4881; G06F 8/70; G06F 9/45525; G06F 11/3024; G06F 11/3495
USPC ........................................................ 717/148
See application file for complete search history.

(56) References Cited

U.S. PATENT DOCUMENTS 6,934,865 B2 * 8/2005 Moritz ................. G06F 1/3203
                                                  713/320
7,430,549 B2    9/2008 Zane et al.
(Continued)

OTHER PUBLICATIONS

Negi, A., et al; "Applying machine learning techniques to improve Linux process scheduling"; Nov. 2005; pp. 1-6.
(Continued)

*Primary Examiner* — Andrew M. Lyons
(74) *Attorney, Agent, or Firm* — Hewlett Packard Enterprise Patent Department

(57) ABSTRACT

Examples analyze source code of a task prior to compiling the source code to determine a static property of the task. Examples determine a category for the task based at least in part on the static property. Examples compile the source code to generate a binary of the task. Examples determine execution parameters for the task based at least in part on the category. Examples schedule the binary for execution based at least in part on the execution parameters.

15 Claims, 9 Drawing Sheets

(51) Int. Cl.
*G06F 11/34* (2006.01)
*G06F 11/36* (2006.01)

(56) References Cited

U.S. PATENT DOCUMENTS

| | | | | |
|---|---|---|---|---|
| 7,673,293 | B2* | 3/2010 | Sanyal | G06F 8/433 717/136 |
| 7,797,692 | B1* | 9/2010 | Czajkowski | G06F 9/5027 712/241 |
| 7,827,534 | B2* | 11/2010 | Vetillard | G06F 11/3608 717/124 |
| 8,146,065 | B2 | 3/2012 | Pirvu et al. | |
| 8,316,102 | B2* | 11/2012 | Matsuzaki | G06F 11/1456 707/640 |
| 8,555,281 | B1* | 10/2013 | van Dijk | G06F 9/4881 718/100 |
| 8,595,743 | B2 | 11/2013 | Gounares et al. | |
| 8,799,693 | B2* | 8/2014 | Vick | G06F 1/32 713/320 |
| 8,990,783 | B1* | 3/2015 | Yu | G06F 8/35 703/22 |
| 9,052,954 | B2* | 6/2015 | Gangemi | G06F 9/5011 |
| 9,317,399 | B2* | 4/2016 | Boshernitsan | G06F 11/3676 |
| 9,477,523 | B1* | 10/2016 | Warman | G06F 9/4887 |
| 9,491,112 | B1* | 11/2016 | Patel | H04L 47/70 |
| 9,529,644 | B1* | 12/2016 | Verma | G06F 9/52 |
| 2002/0162097 | A1* | 10/2002 | Meribout | G06F 17/5045 717/155 |
| 2005/0033576 | A1* | 2/2005 | Maison | G06F 8/30 704/256 |
| 2007/0250825 | A1* | 10/2007 | Hicks | G06F 8/443 717/151 |
| 2008/0163183 | A1* | 7/2008 | Li | G06F 8/456 717/149 |
| 2009/0204963 | A1* | 8/2009 | Swart | G06F 9/44594 718/1 |
| 2010/0125838 | A1 | 5/2010 | Kuusilinna et al. | |
| 2012/0030656 | A1* | 2/2012 | Zingelewicz | G06F 8/77 717/128 |
| 2012/0102098 | A1* | 4/2012 | Guillou | G06F 9/5083 709/203 |
| 2013/0073829 | A1* | 3/2013 | Gounares | G06F 12/0253 711/170 |
| 2014/0007044 | A1* | 1/2014 | Aliseychik | G06F 8/30 717/106 |
| 2014/0007128 | A1* | 1/2014 | Schroth | G06F 9/5044 718/104 |
| 2015/0205588 | A1* | 7/2015 | Bates | G06F 9/4552 717/145 |

OTHER PUBLICATIONS

Cavazos, J., et al., Inducing Heuristics to Decide Whether to Schedule, Jun. 9-11, 2004, PLDI'04, 13 pages.

Vraalsen, F.; "Performance Contracts: Predicting and monitoring grid application behavior", In Proceedings of the 2nd International Workshop on Grid computing, Nov. 2001; 12 pages.

Lei, H., et al.; "An analytical approach to file prefetching"; In Proceedings of the USENIX 1997 Annual Technical Conference, 1997, pp. 275-288.

Nilsen, K., Developing Real-Time Software with Java SE APIs: Part 2, Aug. 2014, Oracle Technology Network, 6 pages.

Arnold, M., et al; "Online Feedback-Directed Optimization of Java"; Nov. 4-8, 2002; 19 pages.

Green Hills Software, Inc.; "Optimizing Speed vs. Size Using the Codebalance Utility for Arm/Thumb and MIPS16 Architectures"; Nov. 1993; 5 pages.

Petrov, P.V.; "Applications of Agent Architectures to Decision Support in Distributed Simulation and Training Systems" Sep. 13, 2011, 44 pages.

Smith, W., et al.; "Predicting Application Run-Times Using Historical Information", Job Scheduling Strategies for Parallel Processing; Mar. 1998; 22 pages.

* cited by examiner

CATEGORY BASED EXECUTION SCHEDULING

BACKGROUND

For computing systems, such as large scale data processing systems, workloads of tasks may be executed by processing resources of the computing system. Generally, tasks (also referred to as jobs) of a workload generally correspond to data processing operations to be performed on datasets.

DRAWINGS

Figure 4A:
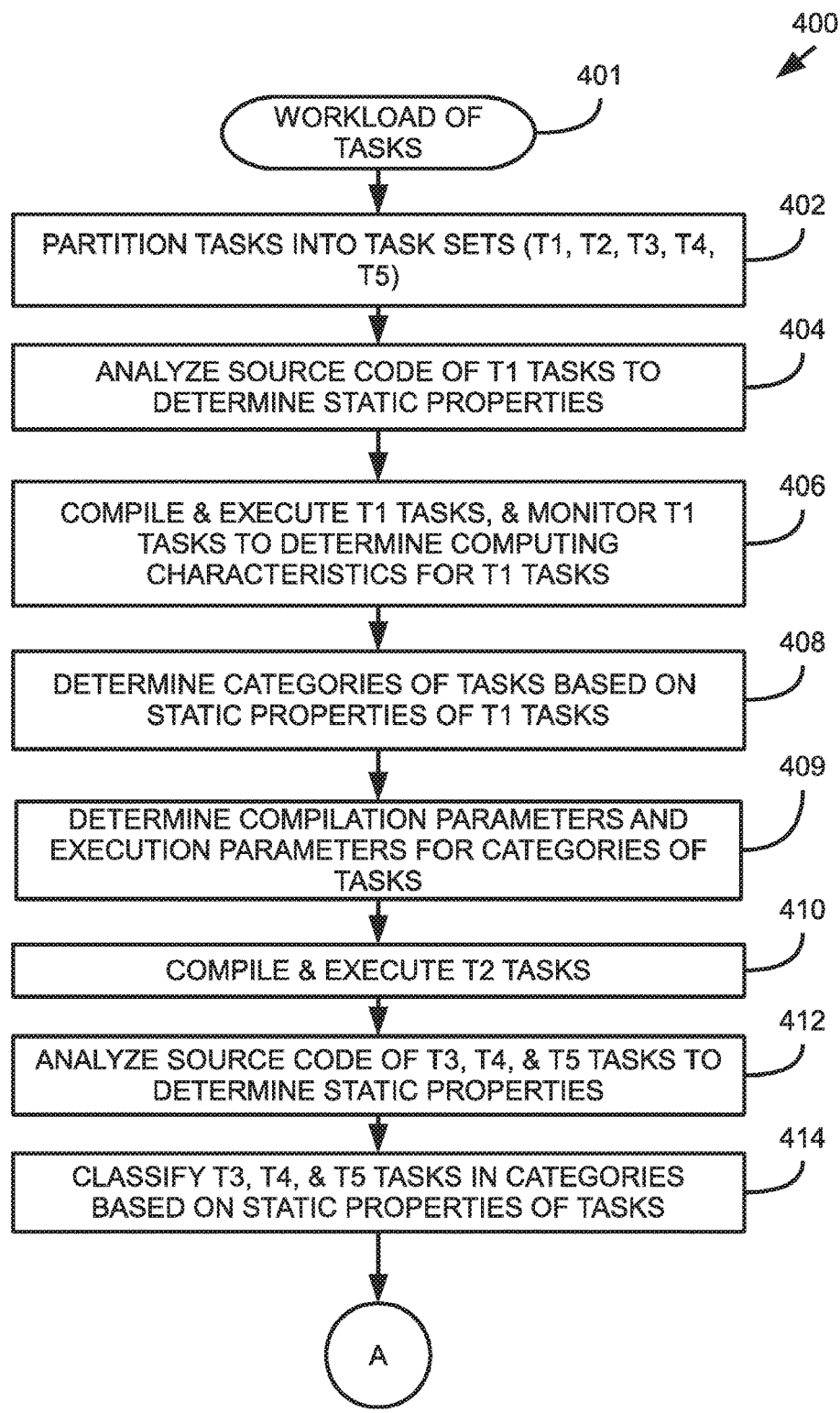
Figure 4B:
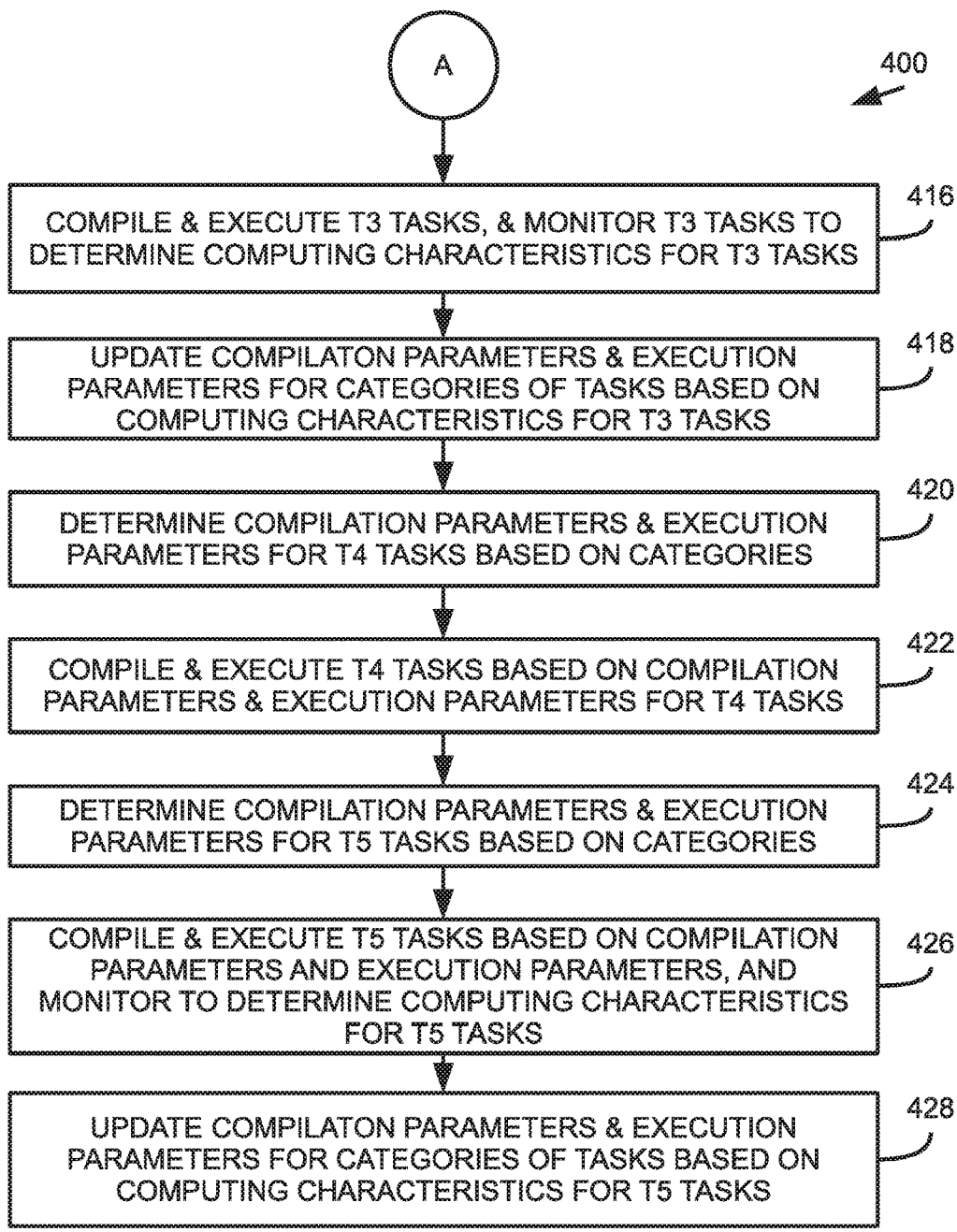

FIGS. 4A-B are flowcharts that illustrate an example sequence of operations that may be performed by an example computing system.

Figure 5:
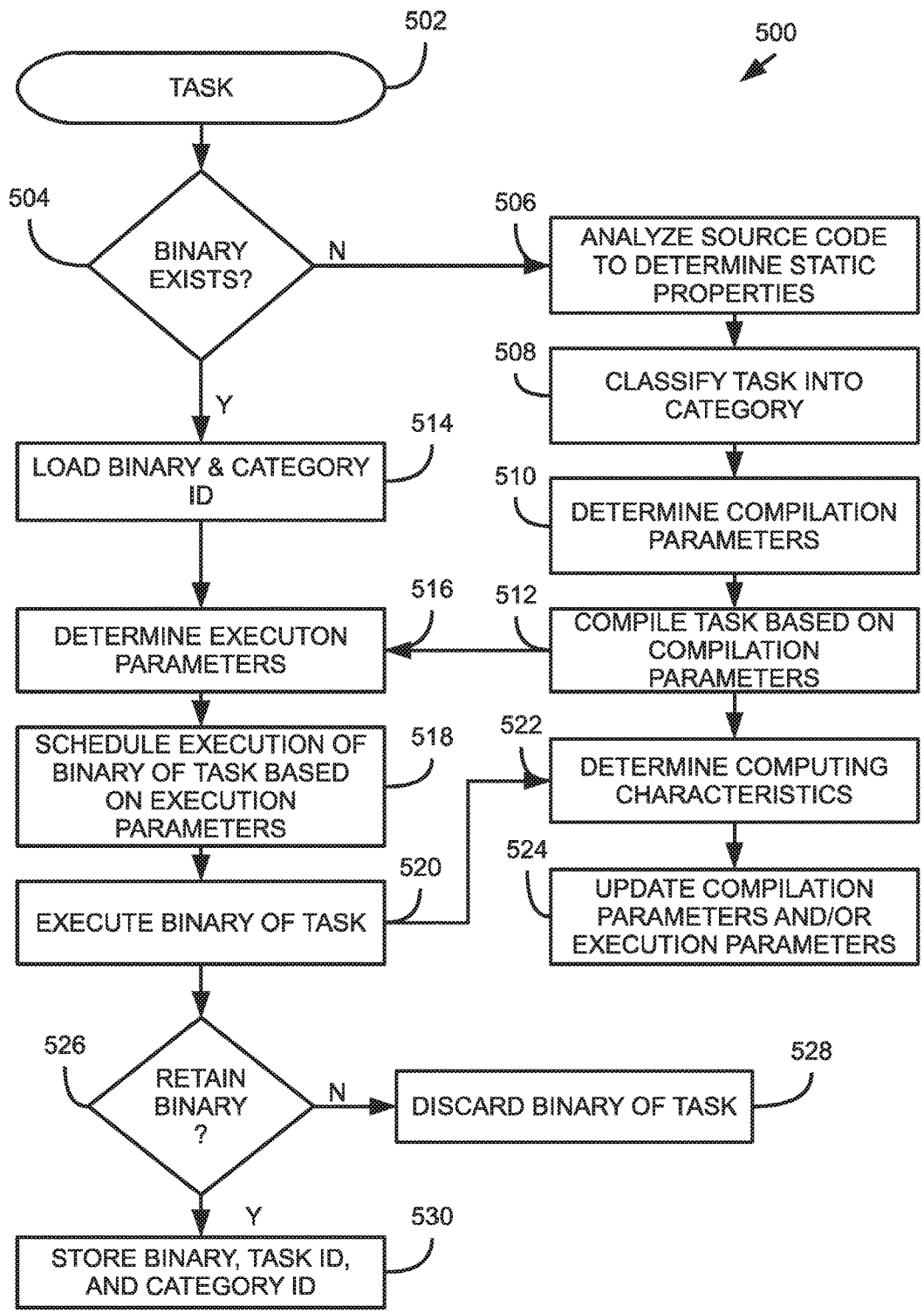

FIG. 5 is a flowchart that illustrates an example sequence of operations that may be performed by an example computing system.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Generally, workload processing by a computing system corresponds to compiling tasks of the workload, scheduling the compiled tasks for execution, and executing the compiled tasks. In examples of workload processing, tasks of the workload may be compiled and/or executed by various processing resources and may access various memory resources. For example, execution of some tasks may access data of particular memory resources and perform various operations on the data. In computing systems that comprise multiple processing resources and/or memory resources, such as server systems with processing nodes arranged in one or more processing blades or other such architectures, tasks may be scheduled for execution on various processing resources and/or to use various memory resources.

As will be appreciated, based on arrangements of processing resources and/or memory resources, the compilation of tasks and/or the execution of tasks (and the scheduling thereof) may lead to efficient utilization of processing resources and/or memory resources. Therefore, examples described herein may analyze source code of tasks prior to compilation to determine static properties of each task. Based on such static properties, examples may classify tasks into categories of tasks, and examples may compile and/or schedule execution of tasks based on the category into which the task is classified. In particular, some examples may monitor compilation and/or execution of tasks to determine computing characteristics of tasks. The computing characteristics may be analyzed to determine compilation parameters and/or execution parameters for the categories of tasks. In such examples, tasks of a particular category may be compiled based on compilation parameters of the category. Similarly, tasks of a particular category may be scheduled for execution based on execution parameters of the particular category. Therefore, examples implement a learning based monitoring and characterization process that may improve task compilation and execution in the computing system.

Generally, tasks of a workload may be loaded/stored in a source code format. Source code may generally refer to a human-readable computer language format that specifies computer operations to be performed. As provided herein, examples may analyze source code of a task to determine one or more static properties for the task. Examples of static properties may include, for example, numerical and/or statistical properties (e.g., minimum, maximum, mean, quantiles, variance, etc.) of: a number of uses of a particular operator or function; a depth of function blocks; a size of data sets used; a number of loops; a length of loops; types and/or locations of data accessed; counting invoked instances of a subroutine, function, procedure, method calls, foreign function library linkage and process linkage (including recursive occurrences), where process linkage corresponds to dependencies between processes, and library linkage corresponds a libraries linked by a process and time to access; a nesting-depth of loops or branching statements; and/or other such properties that may be determined from source code of a task. In some examples, an abstract syntax tree of source code of a task may be analyzed to determine one or more static properties of the task. Based on static properties, tasks may be classified into categories. Generally, tasks of a category comprise similar and/or common static properties. As tasks of categories are compiled and/or executed, some examples may adjust static properties that may be relevant for classification.

In some examples, source code of a task may be compiled to generate an executable format, referred to as a binary. Source code may be compiled immediately prior to execution such that the binary may be generated and executed on the fly, which may be referred to as just-in-time compilation. Examples provided herein may monitor the compilation of source code of tasks. In such examples, processing resource utilization and/or memory resource utilization for compiling a particular task to generate the corresponding binary may be determined (which may be described herein as computing characteristics for the task). Generally, computing characteristics correspond to numerical indicators, metrics, and/or statistical properties (e.g., mean, variance, quantiles, minimum, maximum, distribution, etc.) of processing resource utilization and/or memory resource utilization for compilation and/or execution of a task. Some examples of computing characteristics may include numerical indicators, metrics, and/or statistical properties of compilation time, a statistical property/probability of successful completion of compilation, and/or other such types of information that may be determined from compilation of tasks. In such examples, computing characteristics determined for each task of a particular category of tasks may be analyzed to determine compilation parameters for the particular category. Examples of compilation parameters for a particular category may include memory resource usage characteristics during compilation associated with the particular category, processing resource usage characteristics during compilation associated with the particular category, compilation time characteristics associated with the particular category, and/or other such other such characterizations of observed characteristics during compilation of tasks. For example, if a computing characteristic determined for tasks during compilation comprises an amount of memory used during compilation, some examples may analyze the amount of memory used by each task of a particular category of tasks to determine a compilation parameter corresponding to an average amount of memory used by tasks of the particular category.

In some examples, a binary for a task may be scheduled for execution with processing resources and/or memory resources of a computing system. Examples provided herein may monitor execution of binaries of tasks to determine computing characteristics for each task. As discussed, computing characteristics generally correspond to numerical indicators, metrics, and/or statistical properties (e.g., mean, variance, quantiles, minimum, maximum, distribution, etc.) of processing resource and/or memory resource utilization during execution and/or compilation. Some examples of computing characteristics may comprise numerical indicators, metrics, and/or statistical properties of: processing resource utilization during execution, execution timeouts, task runtime, memory resource utilization during execution, task failure, spatial and temporal characteristics of the distribution of memory accesses, inter-process communication, numbers of subprocesses spawned during execution, types of processing and/or memory resources accessed during execution, and/or other such numerical indicators and/or metric characteristics that may be determined during execution of a task. In some examples, execution parameters for a particular category may be determined by analyzing computing characteristics for tasks of the particular category. Examples of execution parameters may include a time-out parameter associated with the particular category, a probability of binary reuse associated with the category, processing resource usage characteristics during execution associated with the category, memory resource usage characteristics during execution associated with the category, and/or other such characterizations of observed characteristics during execution of tasks. For example, if a computing characteristic that may be determined based on execution of tasks comprises a run time, some examples may analyze a run time of each task of a particular category to determine an execution parameter comprising a time out value for the particular category. In this example, the time out value may be determined such that normally executing tasks of the category would not be incorrectly cancelled due to the time out value, but rather, the time out value would be used during execution to efficiently cancel execution of stalled or non-functioning tasks of the particular category.

Figure 1A:
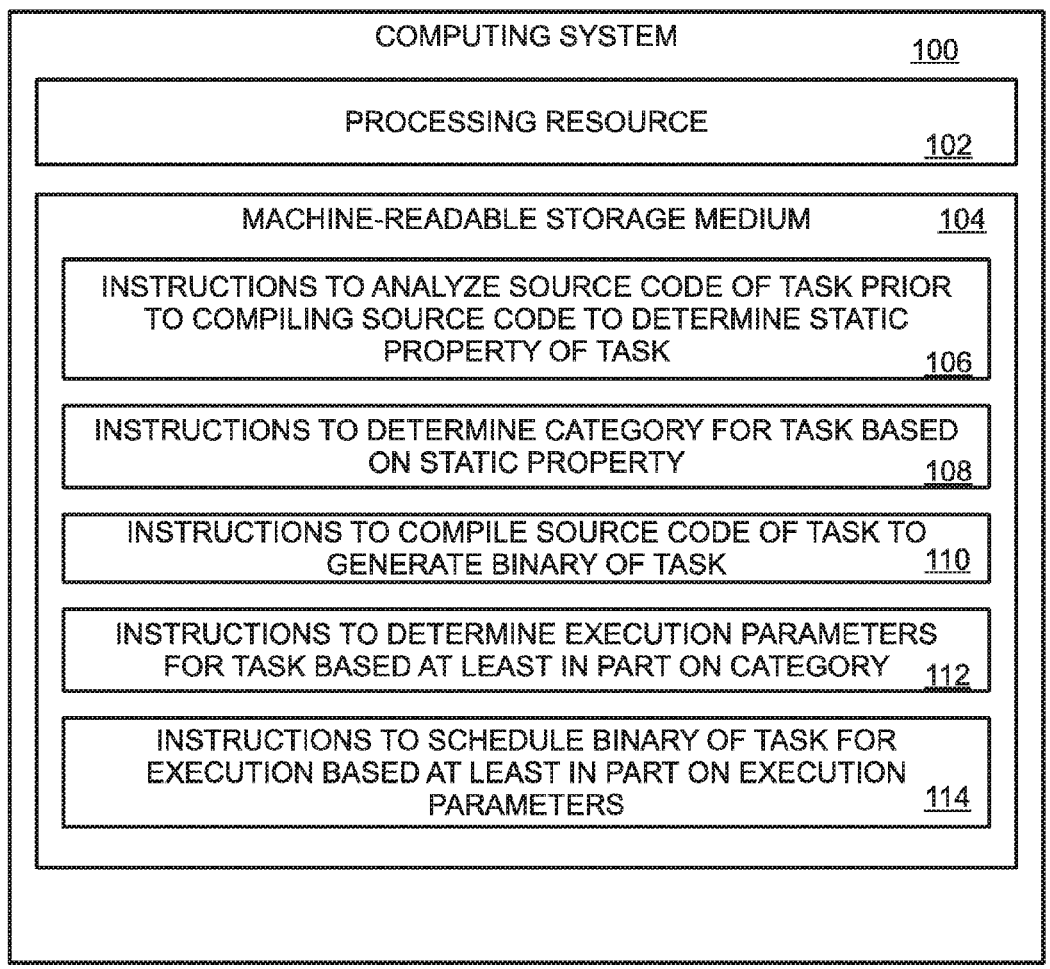
FIG. 1A is a block diagram of an example computing system.
Figure 1B:
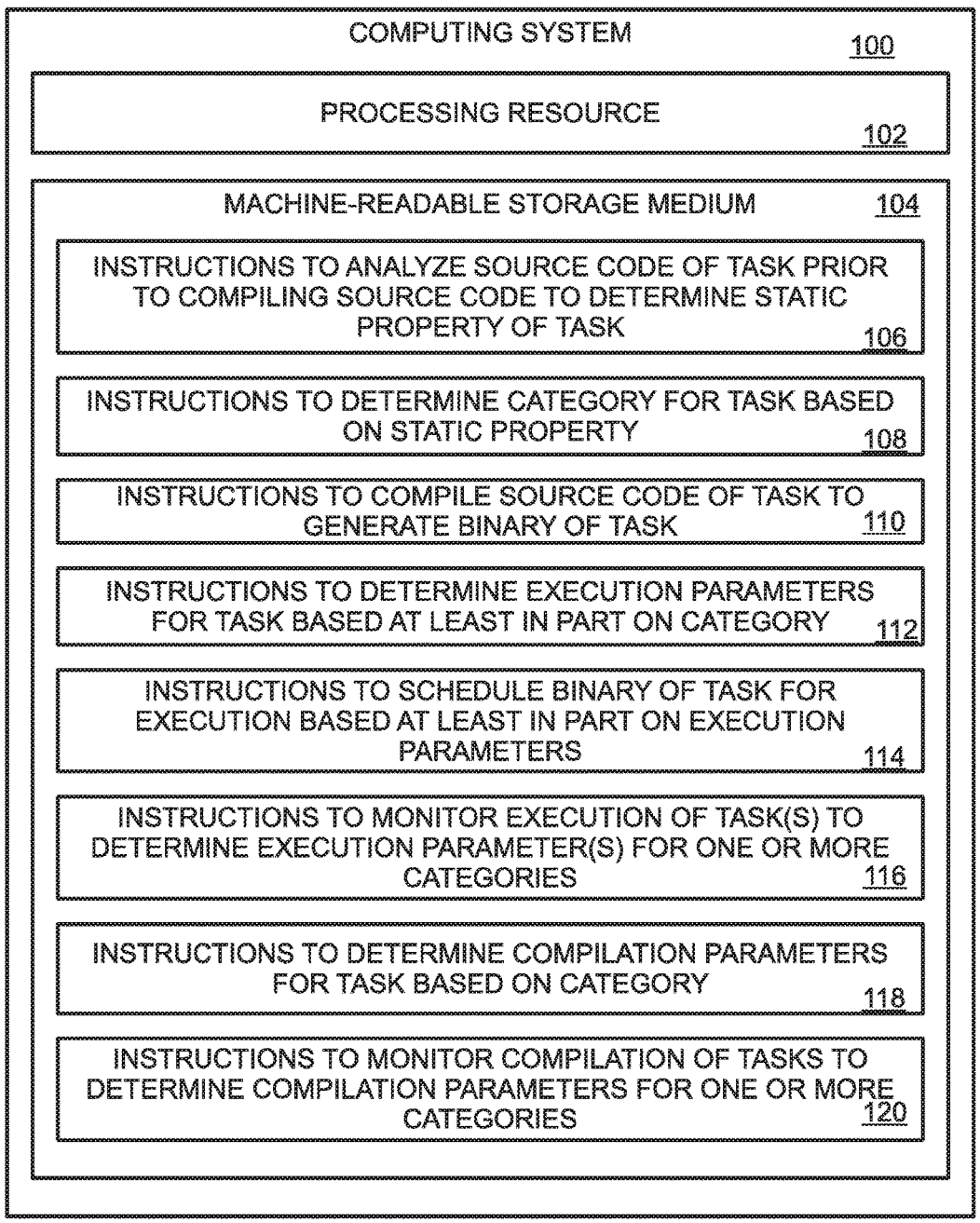
FIG. 1B is a block diagram of an example computing system.
Figure 1C:
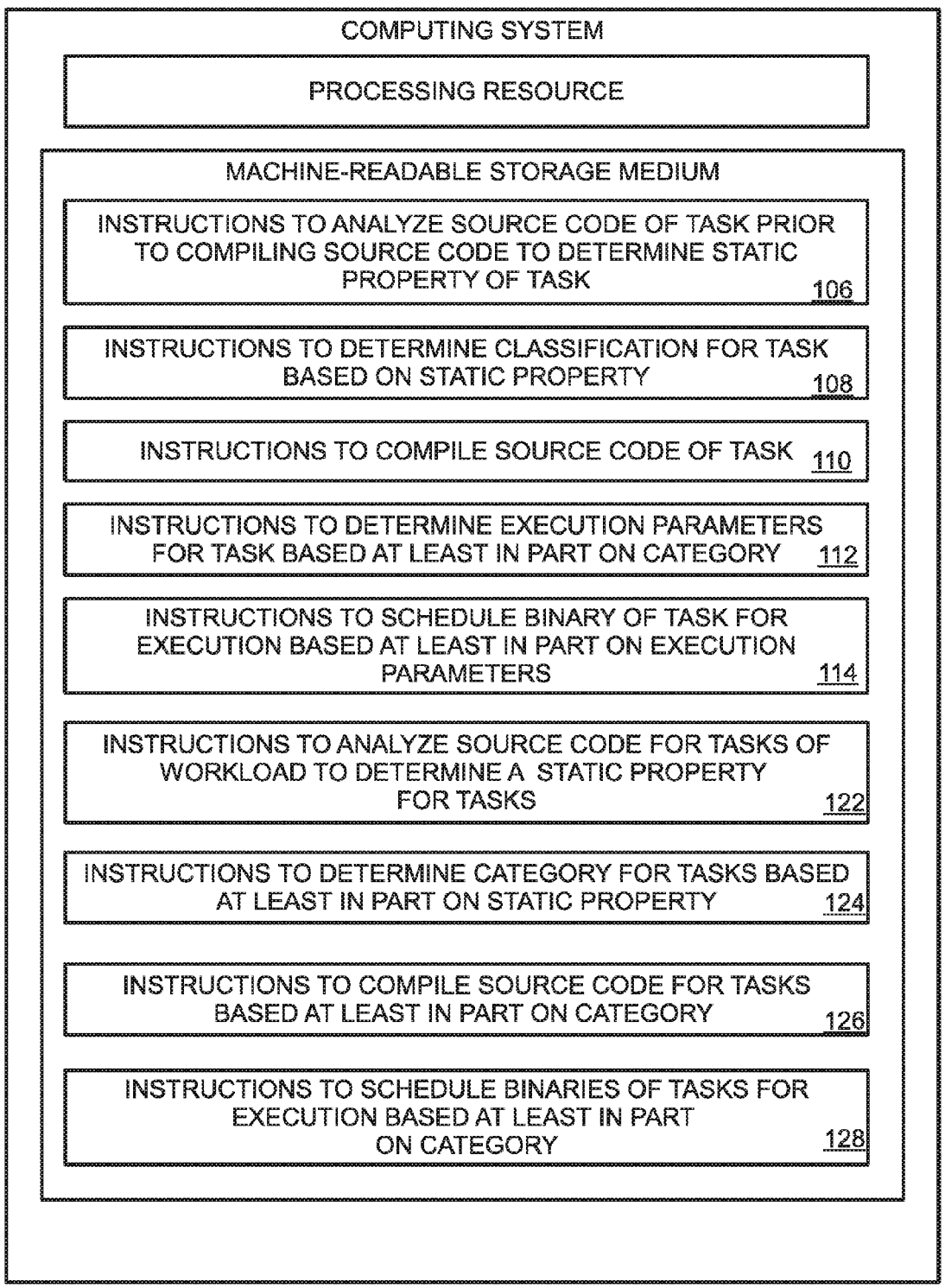
FIG. 1C is a block diagram of an example computing system.

Turning now to the figures, and particularly to FIGS. 1A-C, these figures provide block diagrams that illustrate examples of a computing system 100. Examples of a computing system as disclosed herein include a personal computer, a portable electronic device (e.g., a smart phone, a tablet, a laptop, a wearable device, etc.), a workstation, smart device, server, a processing node of a server, a data center comprising a plurality of servers, a printing device, and/or any other such data processing devices. In the examples, the computing system 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing system 100 or distributed across multiple computing systems connected locally and/or remotely. As will be appreciated, a processing resource 102 may comprise one or more general purpose data processors and/or one or more specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing system 100, as well as any supplemental levels of memory, e.g., cache memories, non-volatile or backup memories (e.g., programmable or flash memories), read-only memories, etc. In addition, machine-readable storage medium 104 may be considered to include memory storage physically located elsewhere, e.g., any cache memory in a microprocessor, as well as any storage capacity used as a virtual memory, e.g., as stored on a mass storage device or on another computing system in communication with the example computing system 100. Furthermore, the machine-readable storage medium 104 may be non-transitory. In some examples, the processing resource 102 and machine-readable storage medium 104 may correspond to processing units and memory devices arranged in at least one server.

Generally, the machine-readable storage medium 104 may be encoded with and/or store instructions that may be executable by the processing resource 102, where execution of such instructions may cause the processing resource 102 and/or computing system 100 to perform the functionalities, processes, and/or sequences of operations described herein. In the example of FIGS. 1A-C, the machine-readable storage medium 104 comprises instructions to schedule tasks of a workload for execution. In particular, the machine-readable storage medium 104 comprises instructions to analyze source code of a particular task of a workload of tasks prior to compiling the source code to determine a static property of the particular task 106. The machine-readable storage medium 104 comprises instructions to determine a category for the particular task based at least in part on the static property of the particular task 108. In addition, the machine-readable storage medium 104 further comprises instructions to compile source code of the particular task to generate a binary of the particular task 110. Furthermore, the machine-readable storage medium 104 comprises instructions to determine execution parameters for the particular task based at least in part on the category of the particular task 112. The machine-readable storage medium 104 further comprises instructions to schedule the binary of the particular task for execution based at least in part on the execution parameters 114.

In addition, as shown in the example computing system 100 of FIG. 1B, the machine-readable storage medium 104 may further comprise instructions to monitor execution of one or more other tasks to determine execution parameters for one or more categories of tasks 116. In some examples, the machine-readable storage medium 104 may comprise instructions to determine compilation parameters for the particular task based at least in part on the category of the particular task 118. In addition, in some examples, the machine-readable storage medium 104 may further comprise instructions to monitor compilation of one or more other tasks to determine compilation parameters for one or more categories of tasks 120.

Furthermore, as shown in the example of FIG. 1C, the machine-readable storage medium 104 may further comprise instructions to analyze source code for some tasks of the workload to determine at least one static property for such tasks of the workload 122. In some examples, the machine-readable storage medium 104 may further comprise instructions to determine a category for each task of the workload based at least in part on at least one static property of each task of the workload 124. In addition, the machine-readable storage medium 104 may further comprise instructions to compile source code for some tasks of the workload to generate a binary for such tasks based at least in part on the category of the tasks 126. In some examples, the machine-readable storage medium 104 may further comprise instructions to schedule tasks for execution (e.g., schedule execution of a binary of a task) based at least in part on the category of each task 128.

While not shown in FIGS. 1A-C, for interface with a user or operator, some example computing systems may include a user interface incorporating one or more user input/output devices, e.g., one or more buttons, a display, a touchscreen, a speaker, etc. The user interface may therefore communicate data to the processing resource and receive data from the processing resource. For example, a user may input one or more selections via the user interface, and the processing resource may cause data to be output on a screen or other output device of the user interface. Furthermore, the computing system may comprise a network interface device. Generally, the network interface device comprises one or more hardware devices to communicate data over one or more communication networks, such as a network interface card.

Figure 2A:
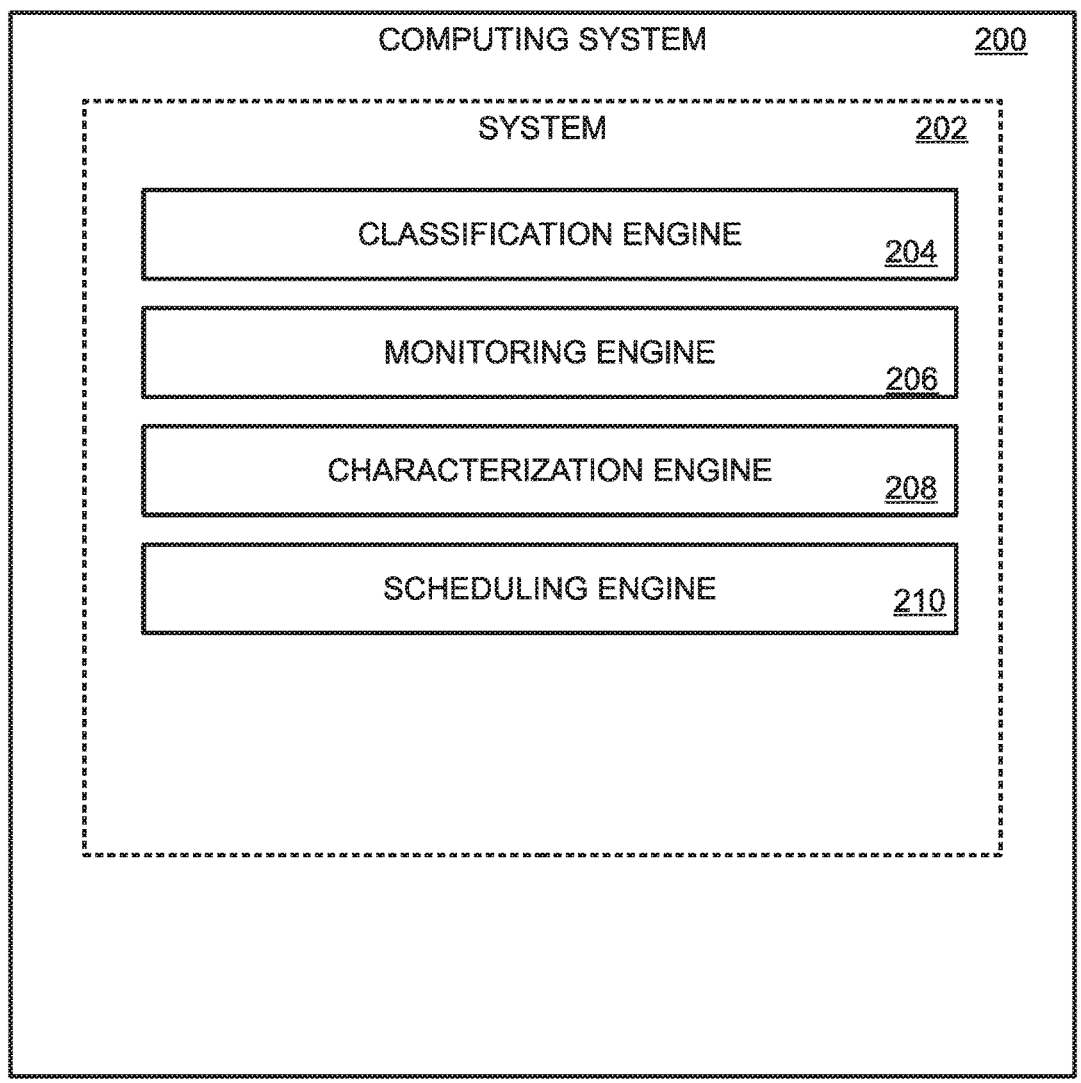
FIG. 2A is a block diagram of an example computing system.
Figure 2B:
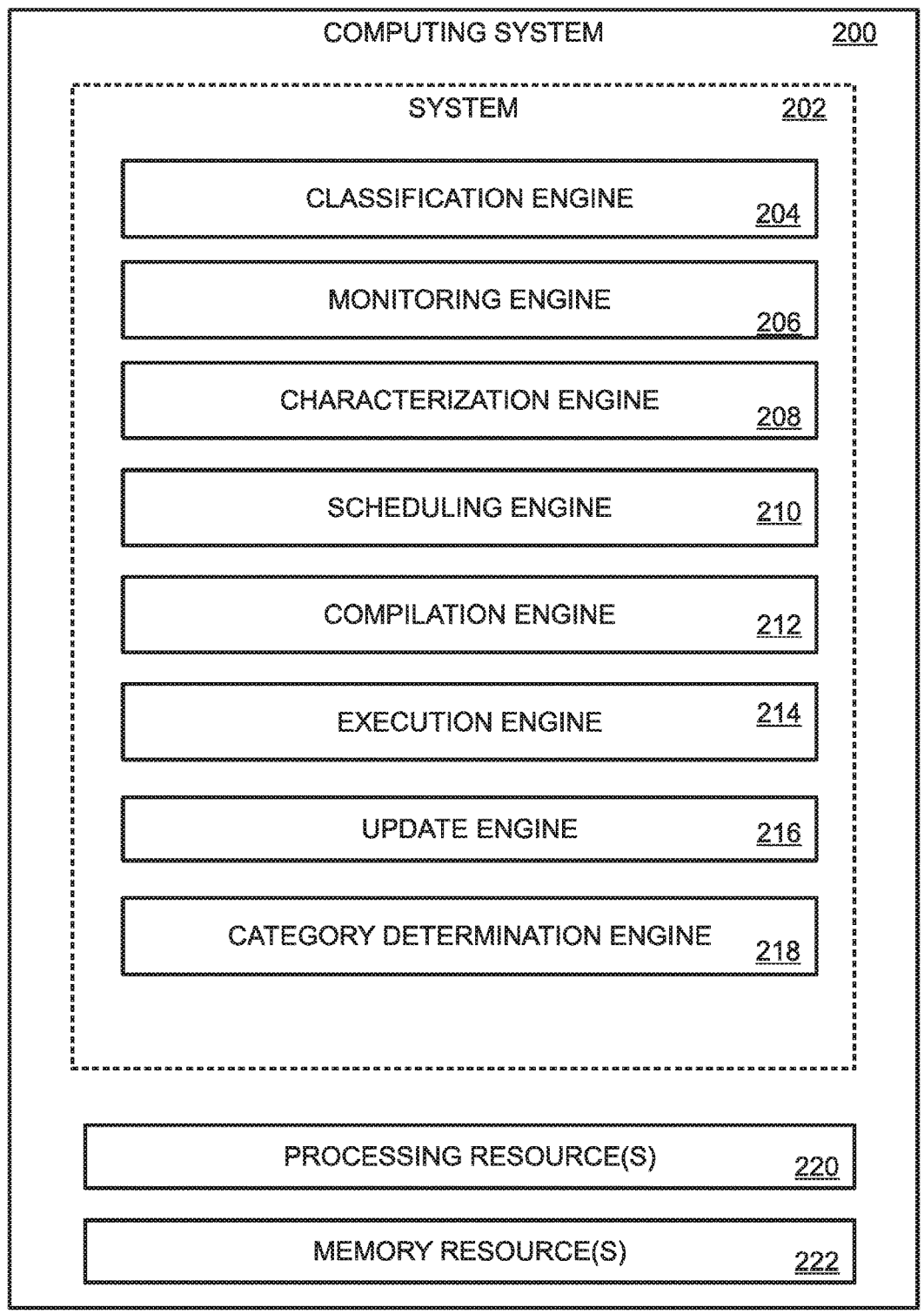
FIG. 2B is a block diagram of an example computing system.

FIGS. 2A-B provide block diagrams of examples of a computing system 200. In the example of examples, the computing system 200 of FIG. 2A comprises a system 202 including engines 204-212, and the example computing system 200 of FIG. 2B comprises a system 202 including engines 204-218. Engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions.

In these examples, a computing system implementing such engines may include the machine-readable storage medium storing the instructions and the processing resource to execute the instructions, or the machine-readable storage medium may be separately stored and accessible by the computing system and the processing resource. In some examples, engines may be implemented in circuitry. Moreover, processing resources used to implement engines may comprise one or more central processing units (CPU), one or more graphics processing units (GPU), one or more application specific integrated circuits (ASICs), and/or other such types of logical components that may be implemented for data processing.

In the example computing system 200 of FIGS. 2A-B, the computing system 200 includes a classification engine 204 to classify tasks of a workload into categories of tasks based at least in part on static properties of the tasks of the workload determined from source code of the tasks. The computing system 200 further comprises a monitoring engine 206 to monitor compilation and execution of tasks of a first task set of tasks of the workload to determine computing characteristics for the tasks of the first task set. In examples such as the examples of FIGS. 2A-B, the computing system 200 comprises a characterization engine 208 to analyze the computing characteristics for the tasks of the first task set to determine compilation parameters and execution parameters for the categories of tasks. Furthermore, the computing system 200 comprises a scheduling engine 210 to schedule execution of the tasks (which may also be referred to as scheduling execution of the binaries of the tasks) of the second task set based at least in part on the execution parameters for the categories of tasks.

In some examples, such as the example computing system 200 of FIG. 2B, the computing system 200 may further comprise a compilation engine 212 to compile tasks of a second task set of tasks of the workload to generate binaries for the tasks of the second task set based at least in part on the compilation parameters for the categories of tasks. In addition, the example computing system 200 of FIG. 2B further comprises an execution engine 214 to execute the binaries for the tasks of the second task set. In such examples, the monitoring engine may monitor compilation of the tasks of the second task set to determine computing characteristics for the tasks of the second task set, and the monitoring engine may monitor execution of the binaries for the tasks of the second task set to determine computing characteristics for the tasks of the second task set. Furthermore, in some examples, the computing system 200 may comprise an update engine 216 to update the execution parameters for the categories of tasks based at least in part on the computing characteristics for the tasks of the second task set responsive to execution of the binaries for the tasks of the second task set. In addition, the update engine 216 may update the compilation parameters of the categories of tasks responsive to compiling of the tasks of the second task set. Furthermore, in some examples, the computing system 200 may comprise a category determination engine 218 to analyze the static properties of the tasks of the workload to determine the categories of tasks into which the tasks of the workload are classified.

In addition, the example computing system 200 of FIG. 2B includes a plurality of processing resources 220 and memory resources 222. As discussed, some examples may be implemented in one or more processing nodes of one or more servers in a data processing center. Therefore, in such examples, scheduling execution of binaries for tasks may comprise selecting respective processing resources and/or memory resources for each respective task. In these examples, the processing resources and/or memory resources may be selected for a particular task based at least in part on execution parameters associated with a category into which the particular task is classified.

Figure 3:
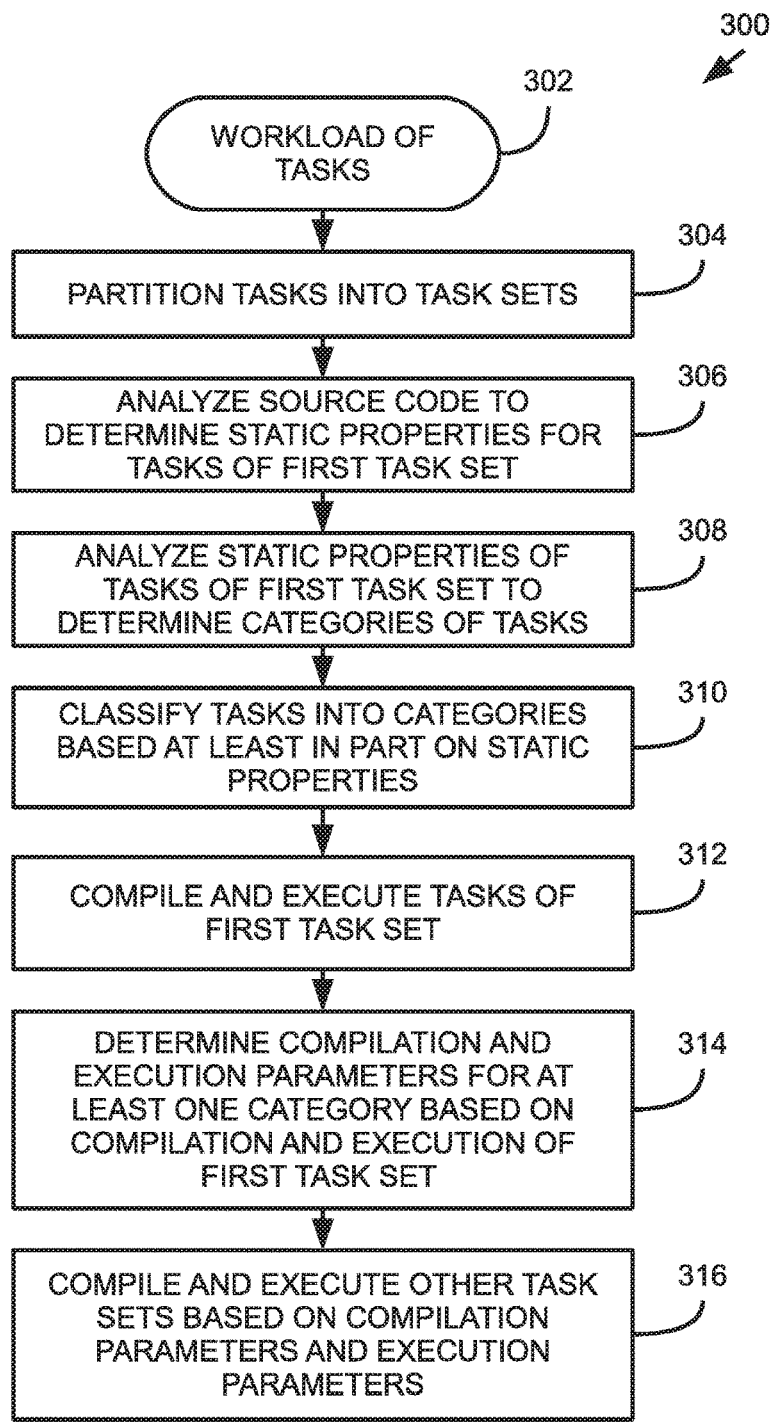
FIG. 3 is a flowchart that illustrates an example sequence of operations that may be performed by an example computing system.

FIGS. 3-5 provide flowcharts that provide example sequences of operations that may be performed by an example computing system and/or a processing resource thereof to perform example processes and methods. In some examples, the operations included in the flowcharts may be embodied in a memory resource (such as the example machine-readable storage mediums 104 of FIGS. 1A-C) in the form of instructions that may be executable by a processing resource to cause the computing system (e.g., the computing system 100 of FIGS. 1A-C, the computing system 200 of FIGS. 2A-B, etc.) to perform the operations corresponding to the instructions. Additionally, the examples provided in FIGS. 3-5 may be embodied in computing systems, machine-readable storage mediums, processes, and/or methods. In some examples, the example processes and/or methods disclosed in the flowcharts of FIGS. 3-6 may be performed by one or more engines implemented in a computing system, such as the example engines 204-218 of FIGS. 2A-B.

Turning now to FIG. 3, this figure provides a flowchart 300 that illustrates an example sequence of operations that may be performed by an example computing system to process a workload of tasks 302. In this example, the computing system may partition the tasks of the workload into task sets (block 304). Generally, the tasks of the workload may be partitioned into two or more task sets, where compilation and execution of a first task set may facilitate characterization of various categories of tasks such that compilation and execution of tasks of the other task sets may be performed based at least in part on the characterization of the categories of tasks. Therefore, in some examples, the first task set may be referred to as the learning task set or training task set.

The example computing system may analyze source code of tasks of the first task set to determine static properties of the tasks of the first task set (block 306). As discussed previously, some examples may analyze an abstract syntax tree of source code of a task to determine some static properties. Some examples of static properties comprise number of uses of a particular operator, the mean depth of function blocks, the mean size of data sets used, a number or length of loops used, other properties described herein, and/or other such properties that may be determined from source code. The computing system may analyze static properties of tasks of the first task set to determine categories of tasks into which the tasks of the workload may be classified (block 308). Generally, categories into which tasks may be classified may be based on the static properties, where examples may implement a learning process to classify tasks. In some examples, the computing system may perform clustering analysis to classify tasks into a categories. In such examples, tasks having similar static properties (e.g., a cluster of tasks) may be classified in a category. Therefore, the computing system determines categories of tasks based on the static properties, where static properties deemed to be relevant to classification may be refined based on computing characteristics, compilation parameters, and/or execution parameters. Based on the static properties of each task of the first task set, the computing system may classify the tasks of the first task set into categories (block 310).

The computing system compiles and executes the tasks of the first task set (block 312), and the computing system determines compilation parameters and execution parameters for at least one respective category of tasks based at least in part on the compilation and execution of the tasks of the first task set (block 314). Generally, determining compilation parameters for a particular category may comprise analyzing computing characteristics associated with compilation of tasks of the particular category. For example, if compilation time is a computing characteristic that is determined during compilation, some examples may determine an average compilation time for tasks of the particular category. Similarly, determining execution parameters for a particular category may comprise analyzing computing characteristics associated with execution of tasks of the particular category. For example, if a completion time for tasks is a computing characteristic determined during execution of the task, some examples may compute a timeout value for tasks of the particular category. In these examples, an empirical distribution of completion times of tasks for the particular category may be analyzed, and a timeout for the particular category may be determined by identifying the smallest timeout value such that a probability of aborting a task of the category is sufficiently low, as may be predefined in settings of the computing system and/or workload. The example computing system compiles and executes tasks of other task sets of the plurality of task sets based at least in part on the compilation parameters and execution parameters for the at least one respective category of tasks.

FIGS. 4A-B provide a flowchart 400 that illustrates an example sequence of operations that may be performed by an example computing system to process a workload of tasks 401. In this example, the computing system partitions tasks into five task sets (T1, T2, T3, T4, and T5 respectively) (block 402). In examples such as the example of FIGS. 4A-B, the tasks may be partitioned into various numbers of task sets. In some examples, the computing system may process tasks of a workload with different configurations based on the number and settings of each task set.

For example, the tasks of task set T1 may not be compiled or executed based on compilation parameters or execution parameters, and compilation parameters and execution parameters may be determined based at least in part on the compilation and monitoring of task set T1. Continuing the example, the tasks of task set T2 may not be compiled and/or executed based on compilation parameters or execution parameters, and the compilation and execution of the tasks of task set T2 may not be used to determine compilation parameters and/or execution parameters. Tasks of task set T3 may not be compiled and/or executed based on compilation parameters or execution parameters, and the compilation and execution of the tasks of task set T3 may be used to determine compilation parameters and/or execution parameters. Tasks of task set T4 may be compiled and/or executed based on compilation parameters or execution parameters, and the compilation and execution of the tasks of task set T4 may not be used to determine compilation parameters and/or execution parameters. Tasks of task set T5 may be compiled and/or executed based on compilation parameters or execution parameters, and the compilation and execution of the tasks of task set T5 may be used to determine compilation parameters and/or execution parameters.

In this example, the computing system analyzes source code of the tasks of task set T1 to determine static properties for the T1 tasks (block 404). The computing system compiles and executes the T1 tasks, and the computing system monitors the compilation and execution of the T1 tasks to determine computing characteristics for the T1 tasks (block 406). The computing system determines categories of tasks based at least in part on the static properties of the T1 tasks (block 408). Furthermore, based on the computing characteristics for the T1 tasks, the computing system determines compilation parameters and execution parameters for the categories of tasks (block 409). In this example, the computing system compiles and executes the T2 tasks (block 410). As will be noted, the tasks of T2 are not classified into categories, and compilation parameters and execution parameters are not utilized in compilation and execution of T2 tasks in this example.

The computing system analyzes source code of the tasks of T3, T4, and T5 to determine static properties for each task (block 412), and each task of T3, T4, and T5 is classified into a respective category based at least in part on the static properties of the task (block 414). Continuing to FIG. 4B (by way of the connector 'A'), the computing system compiles and executes T3 tasks, and the computing system monitors the compilation and execution to determine computing characteristics for the T3 tasks (block 416). The computing system updates compilation parameters and execution parameters for categories of tasks based at least in part on the computing characteristics for T3 tasks (block 418). Notably, in this example, compilation parameters and execution parameters are not implemented in the compilation and execution of T3 tasks; however, compilation parameters and execution parameters may be updated based on computing characteristics determined from compilation and execution of T3 tasks.

The computing system determines compilation parameters and execution parameters for each T4 task based on the category of the task (block 420). The computing system compiles and executes the T4 tasks based on the compilation parameters and the execution parameters for the T4 tasks (block 422). In this example, therefore, compilation parameters and execution parameters may be implemented in the processing of T4 tasks; however, the compilation parameters and execution parameters are not updated based on computing characteristics determined from monitoring compilation and execution of T4 tasks. The computing system determines compilation parameters and execution parameters for each T5 task based at least in part on the category of the respective T5 task (block 424). The computing system compiles and executes T5 tasks based on the compilation parameters and execution parameters for each T5 task, and the computing system monitors compilation and execution of the T5 tasks to determine computing characteristics for the T5 tasks (block 426).

The computing system updates compilation parameters and execution parameters for categories based at least in part on the computing characteristics for T5 tasks (block 428). Therefore, in this example, the computing system processes T5 tasks based at least in part on the compilation parameters and the execution parameters, and the computing system updates compilation parameters and execution parameters based on the compilation and execution of T5 tasks. As will be further appreciated, further workloads of tasks may be processed based on the compilation parameters and/or execution parameters in a similar manner, such that the computing system may further refine relevant static properties for categories, compilation parameters, and/or execution parameters.

Generally, the example provided in FIGS. 4A-B may facilitate various strategies for task compilation, scheduling, and execution. In particular, each task set may be associated with different configurations of compilation parameter based compilation, execution parameter based execution, and/or monitoring of tasks. Some examples may partition tasks into more or fewer task sets to facilitate various workload processing configurations. The configurations of task sets of the example provided in FIGS. 4A-B may be summarized in the example Table 1 provided below:

TABLE 1

|    | Use Compilation/Execution Parameters | Update based on Computing Characteristics |
|----|---------------------------------------|-------------------------------------------|
| T1 | No                                    | Yes                                       |
| T2 | No                                    | No                                        |
| T3 | No                                    | Yes                                       |
| T4 | Yes                                   | No                                        |
| T5 | Yes                                   | Yes                                       |

In some examples, tasks may be partitioned into two task sets having characteristics of task set T1 and T4 described above (i.e., task sets T2, T3, and T5 are empty). In these examples, the computing system may compile and execute tasks of the T1 task set, and the computing system may monitor the compilation and execution of the T1 tasks to determine compilation parameters and execution parameters for use in executing T4 tasks. As will be appreciated, in this example, the compilation parameters and execution parameters may not be updated based on execution of other task sets. In some examples, tasks may be partitioned into task sets having characteristics of task sets T2, T3, T4, and T5 (i.e., task set T1 is empty). Therefore, in these examples, compilation parameters and execution parameters may not be determined from a training phase (generally implemented through execution of T1 tasks). Furthermore, in this example, computing characteristics determined from compilation and execution of T3 tasks may be used to update default compilation parameters and execution parameters. In some examples, tasks may be partitioned into task sets having characteristics of task sets T1, T2, T3, and T4 (i.e., task set T5 is empty). In these examples, compilation parameters and execution parameters may not be updated based on computing characteristics determined from tasks that also compile and execute based on the compilation parameters and the execution parameters. In some examples, tasks may be partitioned into task sets having characteristics of task sets T1, T4, and T5 (i.e., task sets T2 and T3 are empty). In these examples, all tasks of a workload not in task set T1 may be compiled and executed based on compilation parameters and execution parameters.

FIG. 5 provides a flowchart 500 that illustrates an example sequence of operations that may be performed by a computing system to process a task 502 of a workload. In this example, the computing system may implement just-in-time compilation. In some examples of computing systems implementing just-in-time compilation, binaries of tasks may be retained after compilation for re-use in later processing of a repeated task. Therefore, the computing system determines whether a binary exists for the task (block 504). In response to determining that a binary does not exist for the task ("N" branch of block 504), the computing system may analyze source code of the task to determine static properties associated with the task (block 506). The computing system may classify the task into a particular category (block 508), and the computing system may determine compilation parameters for the particular category that may be used in compiling the task (block 510). The computing system compiles the task based on the compilation parameters (block 512). Generally, the compilation parameters may include processing resource usage characteristics during compilation for a respective category and/or memory resource usage characteristics during compilation for a respective category. Therefore, compiling the task based at least in part on the compilation parameters may comprise compiling the source code of the task with one or more particular processing resources and/or memory resources. Similarly, scheduling the task for execution and executing the task (e.g., the binary of the task) may comprise scheduling/executing the task on particular processing resources and/or scheduling/executing the task using particular memory resources.

In response to determining that a binary exists for the task ("Y" branch of block 504), the computing system may load the binary and a category identifier from a stored location (e.g., from a memory resource) (block 514). In general, the category identifier may indicate a category into which a task is classified. In some examples, if a binary of a task is stored for re-use, a category identifier may be stored with the binary such that classification of the task is not repeated.

After loading the binary (block 514) or generating the binary ("block 512), the computing system determines execution parameters associated with the category of the task (block 516) that may be applied during scheduling and/or execution of the binary of the task.

The computing system schedules execution of the task based at least in part on the execution parameters (block 518). As discussed previously, execution parameters may comprise processing resource usage characteristics during execution associated with a category, memory resource usage characteristics during execution associated with a category, etc. Therefore, scheduling execution of a binary of a task based on execution parameters may comprise selecting particular processing resources and/or memory resources of the computing system with which to execute the task. Another example of an execution parameter may comprise a probability that a binary of a task of a category will be reused. The computing system executes the binary of the task with processing resources and/or memory resources of the computing system (block 520).

In this example, the computing system monitors compilation and/or execution to determine computing characteristics based on compilation and execution of tasks. Hence, in this example, the computing system determines computing characteristics for compilation (block 512) and/or execution (block 520) of the task (block 522). Furthermore, the computing system updates compilation parameters and/or execution parameters based on the computing characteristics determined for the task (block 524).

After execution of the binary of the task, the computing system may determine whether to retain the binary of the task (block 526). As discussed, in some examples, an execution parameter may comprise a probability that a binary of task will be reused. While retaining a binary of each task may lead to increases in processing resource efficiency (by avoiding compiling a task multiple times), storing binaries for many tasks may be memory resource inefficient. Therefore, some examples monitor reuse of binaries and/or repeated compilation and/or execution of tasks of a category as computing characteristics to determine, as an execution parameter, a probability that a binary of a task of a particular category will be reused. In these examples, the computing system may determine whether to retain (i.e., store) the binary of the task based at least in part on an execution parameter associated with a probability that a binary will be reused. In response to determining to not retain the binary ("N" branch of block 526), the computing system may discard the binary of the task (block 528). In response to determining to retain the binary ("Y" branch of block 526), the computing system stores the binary, a task identifier, and/or a category identifier in a memory resource (block 530).

Therefore, examples of computing systems, processes, methods, and/or computer program products implemented as executable instructions stored on a non-transitory machine-readable storage medium described herein may process one or more tasks of a workload based on static properties of such tasks. As will be appreciated, classification of tasks into categories of tasks may facilitate dynamic compiling and/or executing of tasks based on compilation parameters and/or execution parameters. In some examples, computing characteristics for tasks of a particular category may be analyzed to determine compilation parameters that may be applied to compilation of other tasks of the particular category. Similarly, computing characteristics for tasks of a particular category may be analyzed to determine execution parameters that may be applied to scheduling and/or execution of other tasks of the particular category. Generally, categorical characterization of tasks may increase processing resource efficiency and/or memory resource efficiency in processing workloads of tasks. In some examples, the compilation and execution of tasks may facilitate dynamic learning of compilation and execution parameters that may be applied to categories of tasks.

In addition, while various examples are described herein, elements and/or combinations of elements may be combined and/or removed for various examples contemplated hereby. For example, the example operations provided herein in the flowcharts of FIGS. 3-5 may be performed sequentially, concurrently, or in a different order. Moreover, some example operations of the flowcharts may be added to other flowcharts, and/or some example operations may be removed from flowcharts. Furthermore, in some examples, various components of the example computing systems of FIGS. 1A-C and/or the computing systems of FIGS. 2A-B may be removed, and/or other components may be added. Similarly, in some examples various instructions of the example memories and/or machine-readable storage mediums of FIGS. may be removed, and/or other instructions may be added (such as instructions corresponding to the example operations of FIGS. 3-5).

The preceding description has been presented to illustrate and describe examples of the principles described. This description is not intended to be exhaustive or to limit examples to any precise form disclosed. Many modifications and variations are possible in light of this description.

The invention claimed is:

1. A computing system comprising:
    a classification engine to classify tasks of a workload into categories of tasks based at least in part on static properties of the tasks of the workload;
    a monitoring engine to monitor compilation and execution of a tasks of a first task set of tasks of the workload to determine computing characteristics for the tasks of the first task set;
    a characterization engine to analyze the computing characteristics for the tasks of the first task set to determine compilation parameters and execution parameters for the categories of tasks;
    a scheduling engine to schedule execution of tasks of a second task set based at least in part on the execution parameters for the categories of tasks;
    a compilation engine to compile tasks of the second task set of tasks of the workload to generate binaries for the tasks of the second task set based at least in part on the compilation parameters for the categories of tasks;
    an execution engine to execute the binaries for the tasks of the second task set,
    wherein the monitoring engine is further to monitor the execution of the binaries for the tasks of the second task set to determine computing characteristics for the tasks of the second task set; and
    an update engine to update the execution parameters for the categories of tasks based at least in part on the computing characteristics for the tasks of the second task set responsive to execution of the binaries for the tasks of the second task set.

2. The computing system of claim 1, wherein the monitoring engine is further to monitor the compilation of the tasks of the second task set to determine computing characteristics for the tasks of the second task set, and
    wherein the update engine updates the compilation parameters for the categories of tasks responsive to compiling the tasks of the second task set.

3. The computing system of claim 2, wherein the compilation engine is further to, after the update engine updates the compilation parameters, compile tasks of a third task set of tasks of the workload to generate binaries for the tasks of the third task set based at least in part on the compilation parameters for the categories of tasks, and
  wherein the scheduling engine is further to, after the update engine updates the execution parameters, schedule execution of the tasks of the third task set based at least in part on the execution parameters for the categories of tasks.

4. The computing system of claim 1, further comprising:
a category determination engine to analyze the static properties of the tasks of the workload to determine the categories of tasks into which the tasks of the workload are classified.

5. The computing system of claim 1, further comprising:
a plurality of processing resources,
  wherein the execution parameters comprise processing resource usage characteristics associated with a particular category of tasks, and
  wherein the scheduling engine to schedule execution of the tasks of the second task set comprises the scheduling engine to:
    for each respective task of the second task set associated with the particular category of tasks, select a respective processing resource of the plurality of processing resources to execute the respective task based at least in part on the processing resource usage characteristics of the particular category of tasks.

6. A method comprising:
classifying, by at least one processor, tasks of a workload into categories of tasks based at least in part on static properties of the tasks of the workload;
monitoring, by the at least one processor, compilation and execution of a tasks of a first task set of tasks of the workload to determine computing characteristics for the tasks of the first task set;
analyzing, by the at least one processor, the computing characteristics for the tasks of the first task set to determine compilation parameters and execution parameters for the categories of tasks;
scheduling, by the at least one processor, execution of tasks of a second task set based at least in part on the execution parameters for the categories of tasks;
compiling, by the at least one processor, tasks of the second task set of tasks of the workload to generate binaries for the tasks of the second task set based at least in part on the compilation parameters for the categories of tasks;
executing, by the at least one processor, the binaries for the tasks of the second task set,
monitoring, by the at least one processor, the execution of the binaries for the tasks of the second task set to determine computing characteristics for the tasks of the second task set; and
updating, by the at least one processor, the execution parameters for the categories of tasks based at least in part on the computing characteristics for the tasks of the second task set responsive to execution of the binaries for the tasks of the second task set.

7. The method of claim 6, further comprising monitoring the compilation of the tasks of the second task set to determine computing characteristics for the tasks of the second task set, and updating the compilation parameters for the categories of tasks responsive to compiling the tasks of the second task set.

8. The method of claim 7, further comprising, after updating the compilation parameters, compiling tasks of a third task set of tasks of the workload to generate binaries for the tasks of the third task set based at least in part on the compilation parameters for the categories of tasks, and, after the updating the execution parameters, scheduling execution of the tasks of the third task set based at least in part on the execution parameters for the categories of tasks.

9. The method of claim 6, further comprising:
analyzing the static properties of the tasks of the workload to determine the categories of tasks into which the tasks of the workload are classified.

10. A non-transitory machine-readable storage medium comprising instructions executable by a processing resource of a computing system to cause the computing system to:
classify tasks of a workload into categories of tasks based at least in part on static properties of the tasks of the workload;
monitor compilation and execution of a tasks of a first task set of tasks of the workload to determine computing characteristics for the tasks of the first task set;
analyze the computing characteristics for the tasks of the first task set to determine compilation parameters and execution parameters for the categories of tasks;
schedule execution of tasks of a second task set based at least in part on the execution parameters for the categories of tasks;
compile tasks of the second task set of tasks of the workload to generate binaries for the tasks of the second task set based at least in part on the compilation parameters for the categories of tasks;
execute the binaries for the tasks of the second task set,
monitor the execution of the binaries for the tasks of the second task set to determine computing characteristics for the tasks of the second task set; and
update, by the at least one processor, the execution parameters for the categories of tasks based at least in part on the computing characteristics for the tasks of the second task set responsive to execution of the binaries for the tasks of the second task set.

11. The non-transitory machine-readable storage medium of claim 10, further comprising instructions to cause the computing system to:
monitor the compilation of the tasks of the second task set to determine computing characteristics for the tasks of the second task set, and
update the compilation parameters for the categories of tasks responsive to compiling the tasks of the second task set.

12. The non-transitory machine-readable storage medium of claim 11, further comprising instructions to cause the computing system to:
after update of the compilation parameters, compile tasks of a third task set of tasks of the workload to generate binaries for the tasks of the third task set based at least in part on the compilation parameters for the categories of tasks, and, after the update of the execution parameters, schedule execution of the tasks of the third task set based at least in part on the execution parameters for the categories of tasks.

13. The non-transitory machine-readable storage medium of claim 10, further comprising instructions to cause the computing system to:

analyze the static properties of the tasks of the workload to determine the categories of tasks into which the tasks of the workload are classified.

14. The non-transitory machine-readable storage medium of claim 10, further comprising instructions to cause the computing system to:
analyze the static properties of the tasks of the workload to determine the categories of tasks into which the tasks of the workload are classified.

15. The non-transitory machine-readable storage medium of claim 10, wherein the execution parameters comprise processing resource usage characteristics for a plurality of processing resources associated with a particular category of tasks, wherein the non-transitory machine-readable storage medium further comprising instructions to cause the computing system to:
for each respective task of the second task set associated with the particular category of tasks, select a respective processing resource of the plurality of processing resources to execute the respective task based at least in part on the processing resource usage characteristics of the particular category of tasks.

\* \* \* \* \*